(12) United States Patent
Holstine et al.

(10) Patent No.: US 11,299,281 B2
(45) Date of Patent: Apr. 12, 2022

(54) PARACHUTE ASSEMBLIES WITH ELASTOMERIC INSERTS

(71) Applicant: AMI INDUSTRIES, INC., Colorado Springs, CO (US)

(72) Inventors: Steve Holstine, Colorado Springs, CO (US); Kassidy L. Carson, Colorado Springs, CO (US); John Hampton, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 16/983,459

(22) Filed: Aug. 3, 2020

(65) Prior Publication Data
US 2022/0033094 A1    Feb. 3, 2022

(51) Int. Cl.
*B64D 17/36*    (2006.01)

(52) U.S. Cl.
CPC .................. *B64D 17/36* (2013.01)

(58) Field of Classification Search
CPC ...... B64D 17/24; B64D 17/26; B64D 17/346; B64D 17/36
See application file for complete search history.

(56) References Cited

U.S. PATENT DOCUMENTS

| | | | |
|---|---|---|---|
| 2,520,931 A * | 9/1950 | Heinrich | B64D 17/36 244/152 |
| 3,508,727 A | 4/1970 | Willems | |
| 3,887,151 A * | 6/1975 | Matsuo | B64D 17/346 244/152 |
| 4,264,311 A | 4/1981 | Call et al. | |
| 6,565,041 B1 | 5/2003 | Young et al. | |
| 7,584,927 B2 | 9/2009 | Giles, III | |
| 9,669,946 B2 | 6/2017 | McDonnell et al. | |
| 2001/0050323 A1 | 12/2001 | Brownell | |
| 2009/0038530 A1 | 2/2009 | Truong et al. | |
| 2015/0377598 A1 | 12/2015 | Runck | |
| 2017/0327236 A1 * | 11/2017 | Mastrolia | B64D 17/386 |
| 2019/0344897 A1 | 11/2019 | Reasner et al. | |
| 2020/0094972 A1 | 3/2020 | Volny et al. | |
| 2020/0094973 A1 | 3/2020 | Volny et al. | |
| 2020/0094974 A1 | 3/2020 | Volny et al. | |

(Continued)

FOREIGN PATENT DOCUMENTS

| | | |
|---|---|---|
| FR | 757245 | 12/1933 |
| FR | 779990 | 4/1935 |

(Continued)

OTHER PUBLICATIONS

United Kingdom Intellectual Property Office, United Kingdom Search Report dated Jan. 19, 2022 in Application No. GB2111200.8.

(Continued)

*Primary Examiner* — Richard G Davis
(74) *Attorney, Agent, or Firm* — Snell & Wilmer L.L.P.

(57) ABSTRACT

A parachute assembly may comprise a canopy and a plurality of suspension lines coupled to the canopy. Each of the suspension lines may include an elastomeric insert coupled between a first portion of the suspension line and a second portion of the suspension line. At least a portion of the elastomer insert may be located within an internal volume of the suspension line.

18 Claims, 8 Drawing Sheets

(56) References Cited

U.S. PATENT DOCUMENTS

| | | | |
|---|---|---|---|
| 2020/0094975 | A1 | 3/2020 | Volny et al. |
| 2020/0156797 | A1 | 5/2020 | Volny et al. |
| 2020/0223551 | A1 | 7/2020 | Volny et al. |

FOREIGN PATENT DOCUMENTS

| | | |
|---|---|---|
| FR | 2513717 | 4/1983 |
| GB | 118860 | 9/1918 |

OTHER PUBLICATIONS

USPTO, Notice of Allowance dated Nov. 22, 2021 in U.S. Appl. No. 16/983,496.
USPTO, Supplemental Notice of Allowance dated Jan. 12, 2022 in U.S. Appl. No. 16/983,496.

\* cited by examiner

PARACHUTE ASSEMBLIES WITH ELASTOMERIC INSERTS

FIELD

The present disclosure relates to parachute assemblies, and more specifically, to parachute assemblies having elastomeric inserts.

BACKGROUND

Parachutes may be used to slow and stabilize an object (e.g., ejection seat or a person) supported by the parachute. Parachutes typically comprise a canopy to increase drag, and suspension lines coupled to the canopy. The suspension lines may be weaved or otherwise bound to one another to form risers configured to attach the object to the parachute and stabilize the object to reduce rotation while under canopy. During the deployment of the parachute, potentially dangerous loads may be generated and imparted onto the occupant as a parachute is opened and begins to slow the occupant's decent. These loads, often referred to as "shock loads" or "snatch loads" present a safety risk to the occupant. The loads can also cause the suspension lines to brake. Broken suspension lines tend to produce asymmetric load distribution, which can reduce stability, drag, and symmetry, which may transfer instability to the occupant and/or increase the chances of occupant injury.

SUMMARY

A parachute assembly is disclosed herein. In accordance with various embodiments, the parachute assembly may comprise a suspension line and a first elastomeric insert. The first elastomeric insert may be coupled between a first portion of the suspension line and a second portion of the suspension line.

In various embodiments, at least a portion of the first elastomeric insert is located within an internal volume of the suspension line. In various embodiments, a first stitching may couple a first segment of the first elastomeric insert to the first portion of the suspension line. A second stitching may couple a second segment of the first elastomeric insert to the second portion of the suspension line.

In various embodiments, a third segment of the first elastomeric insert may be located external to the suspension line. The third segment may extend between the first segment and the second segment. In various embodiments, a length of the first segment of the first elastomeric insert is at least 6 inches. The length of the first segment is measured between the first stitching and an opening in the suspension line through which the first elastomeric insert is located.

In various embodiments, the first elastomeric insert includes a first segment located within an internal volume of the suspension line, a second segment located within the internal volume of the suspension line and a third segment located external to the suspension line and extending between the first segment and the second segment. The, the first elastomeric insert may further include a fourth segment located external to the suspension line and extending from the first segment to a first end of the first elastomeric insert, and a fifth segment located external to the suspension line and extending from the second segment to a second end of the first elastomeric insert.

In various embodiments, the fourth segment may be coupled to the suspension line by at least one of an adhesive or a heat bonding. In various embodiments, the fourth segment may include at least one of a crimp or a knot configured to block the fourth segment from translating into the internal volume of the suspension line.

In various embodiments, a second elastomeric insert may be coupled to the suspension line.

A parachute assembly is also disclosed herein. In accordance with various embodiments, the parachute assembly may comprise a canopy and a plurality of suspension lines coupled to the canopy. Each suspension line of the plurality of suspension lines may include an elastomeric insert coupled between a first portion of the suspension line and a second portion of the suspension line.

In various embodiments, at least a portion of the elastomeric insert is located within an internal volume of the suspension line. In various embodiments, each suspension line of the plurality of suspension lines may further include a first stitching coupling a first segment of the elastomeric insert to the first portion of the suspension line and a second stitching coupling a second segment of the elastomeric insert to the second portion of the suspension line.

In various embodiments, a third segment of the elastomeric insert may be located external to the suspension line. The third segment may extend between the first segment and the second segment.

In various embodiments, the elastomeric insert may include a first segment located within an internal volume of the suspension line, a second segment located within the internal volume of the suspension line, and a third segment located external to the suspension line and extending between the first segment and the second segment. The elastomeric insert may further include a fourth segment located external to the suspension line and extending from the first segment to a first end of the elastomeric insert, and a fifth segment located external to the suspension line and extending from the second segment to a second end of the elastomeric insert.

In various embodiments, the fourth segment may be coupled to the suspension line by at least one of an adhesive or a heat bonding. In various embodiments, the fourth segment may include at least one of a crimp or a knot configured to block the fourth segment from translating into the internal volume of the suspension line.

A method of testing a parachute assembly is also disclosed herein. In accordance with various embodiments, the method may comprise deploying a canopy of the parachute assembly, increasing a tensile load applied to a suspension line coupled to the canopy, and stretching an elastomeric insert coupled between a first portion of the suspension line and a second portion of the suspension line.

In various embodiments, the elastomeric insert is coupled to the suspension line at a first attachment point and at a second attachment point. A length of the elastomeric insert, as measured between the first attachment point and the second attachment point, may be configured to allow the elastomeric insert to stretch to a length of the suspension line, as measured between the first attachment point and the second attachment point, without breaking.

In various embodiments, the elastomeric insert may include a first segment located within an internal volume of the suspension line, a second segment located within the internal volume of the suspension line, and a third segment extending between the first segment and the second segment and located outside to the suspension line.

In various embodiments, the elastomeric insert may further include a fourth segment located outside the suspension line and extending from the first segment to a first end of the elastomeric insert, and a fifth segment located outside the suspension line and extending from the second segment to a second end of the elastomeric insert.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein is a parachute assembly including suspension line attenuators. In accordance with various embodiments, the suspension line attenuators include elastomeric inserts coupled to the suspension lines. The elastomeric inserts may absorb, at least, some of the load produced by the opening of canopy, thereby decreasing the force exerted on the occupant of parachute assembly.

Figure 1:
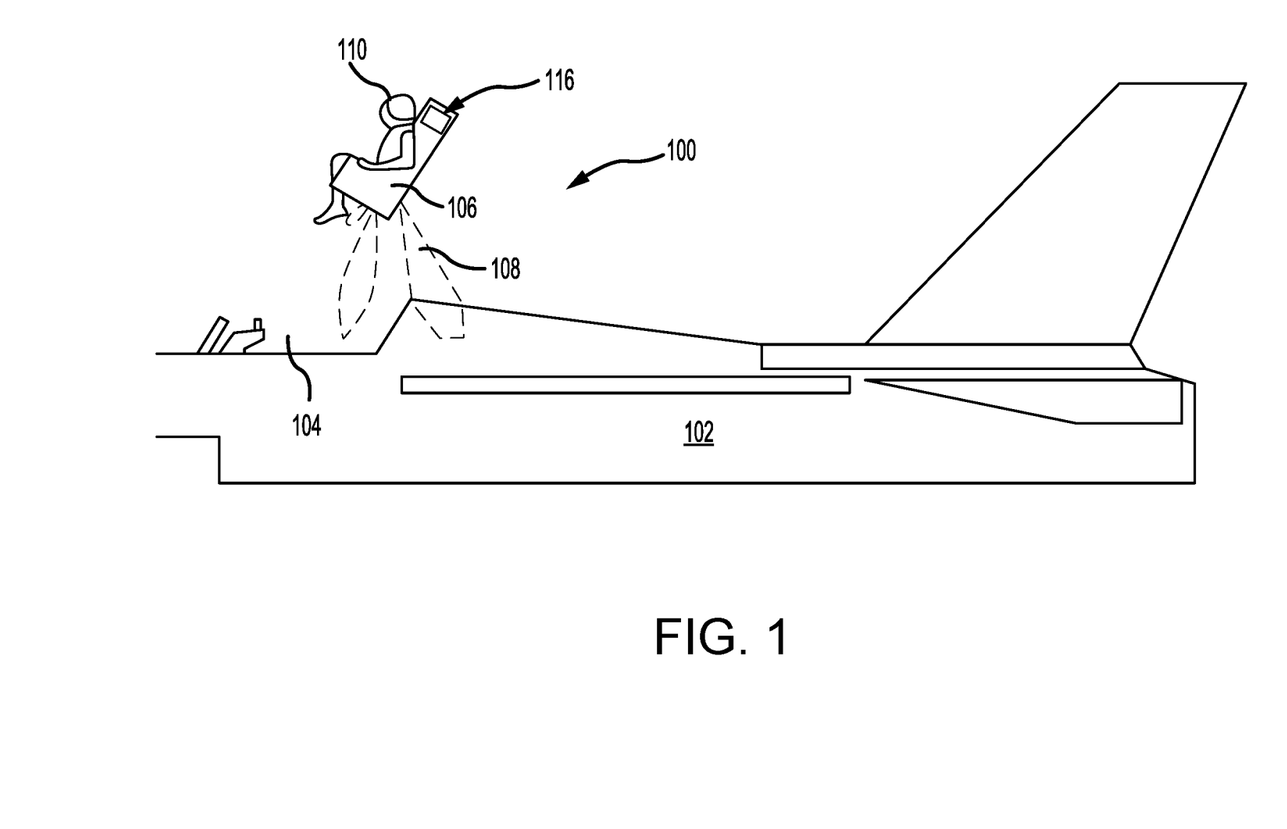
FIG. 1 illustrates an ejection seat being launched from an aircraft cockpit, in accordance with various embodiments.

With reference to FIG. 1, an aircraft ejection system 100 is shown, in accordance with various embodiments. Aircraft ejection system 100 may be installed in aircraft 102 to safely expel ejection seat 106 and an occupant 110 of ejection seat 106 from cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
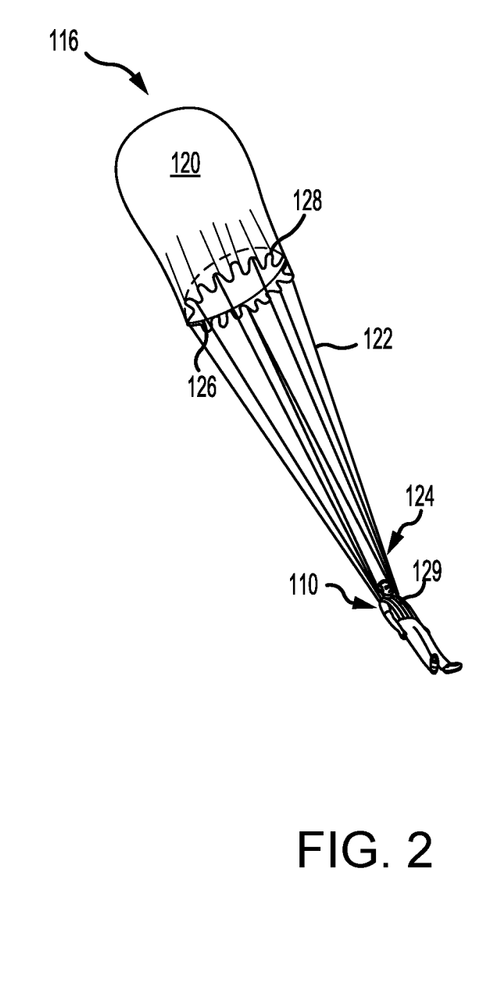
FIG. 2 illustrates an occupant being supported by a deployed parachute assembly, in accordance with various embodiments.

With reference to FIG. 2, parachute assembly 116 is illustrated in a deployed state. Parachute assembly 116 may be used to increase a drag of, or otherwise decelerate, occupant 110 in response to occupant 110 being ejected, jumped, ditched, and/or dropped (collectively, "ejected") from an aircraft. Parachute assembly 116 may comprise a canopy 120, suspension lines 122, and risers 124.

Upon deployment of parachute assembly 116, canopy 120 may open to increase drag, or otherwise decelerate, occupant 110. Canopy 120 may comprise any suitable type of canopy and any suitable type of material, such as, for example, canvas, silk, nylon, aramid fiber (e.g., KEVLAR®), polyethylene terephthalate, and/or the like. In various embodiments, parachute assembly 116 may include one or more reefing line(s) 126. Reefing line 126 may be coupled to canopy 120 proximate a circumferential edge 128 of canopy 120. Reefing line 126 is configured to restrict expansion of canopy 120 such that canopy 120 opens in stages. For example, reefing line 126 may be cut, or otherwise severed, at a preselected time after deployment of canopy 120. Prior to cutting reefing line 126, canopy 120 is held at a first, restricted diameter; after reefing line 126 is severed, canopy 120 is able to open further and its diameter increases. Opening canopy 120 in stages may reduce opening shock to parachute assembly 116. The time delay between deploying canopy 120 and severing reefing line 126 may comprise any suitable time delay based on properties of parachute assembly 116, the type of aircraft, and/or the load limitations of the object (e.g., occupant 110) being carried by parachute assembly 116.

Suspension lines 122 may be coupled to canopy 120 using any suitable attachment technique, such as, for example, through stitching. Suspension lines 122 may be configured to at least partially stabilize deployed canopy 120. The suspension lines 122 may be weaved or otherwise bound to one another to form risers 124. Risers 124 may be configured to attach to a harness 129, or other structure, configured to secure occupant 110 to risers 124. Stated differently, suspension lines 122 and risers 124 are configured to couple an object (e.g., harness 129 and occupant 110) to canopy 120. Suspension lines 122 and risers 124 may comprise any suitable material. For example, suspension lines 122 may comprise a tubular braided material that constricts in diameter under tension, such as, for example, nylon, aramid fiber (e.g., KEVLAR®), and/or the like. Risers 124 may comprise a webbing formed from the weaved or otherwise bound together material of suspension lines 122.

Figure 3A:
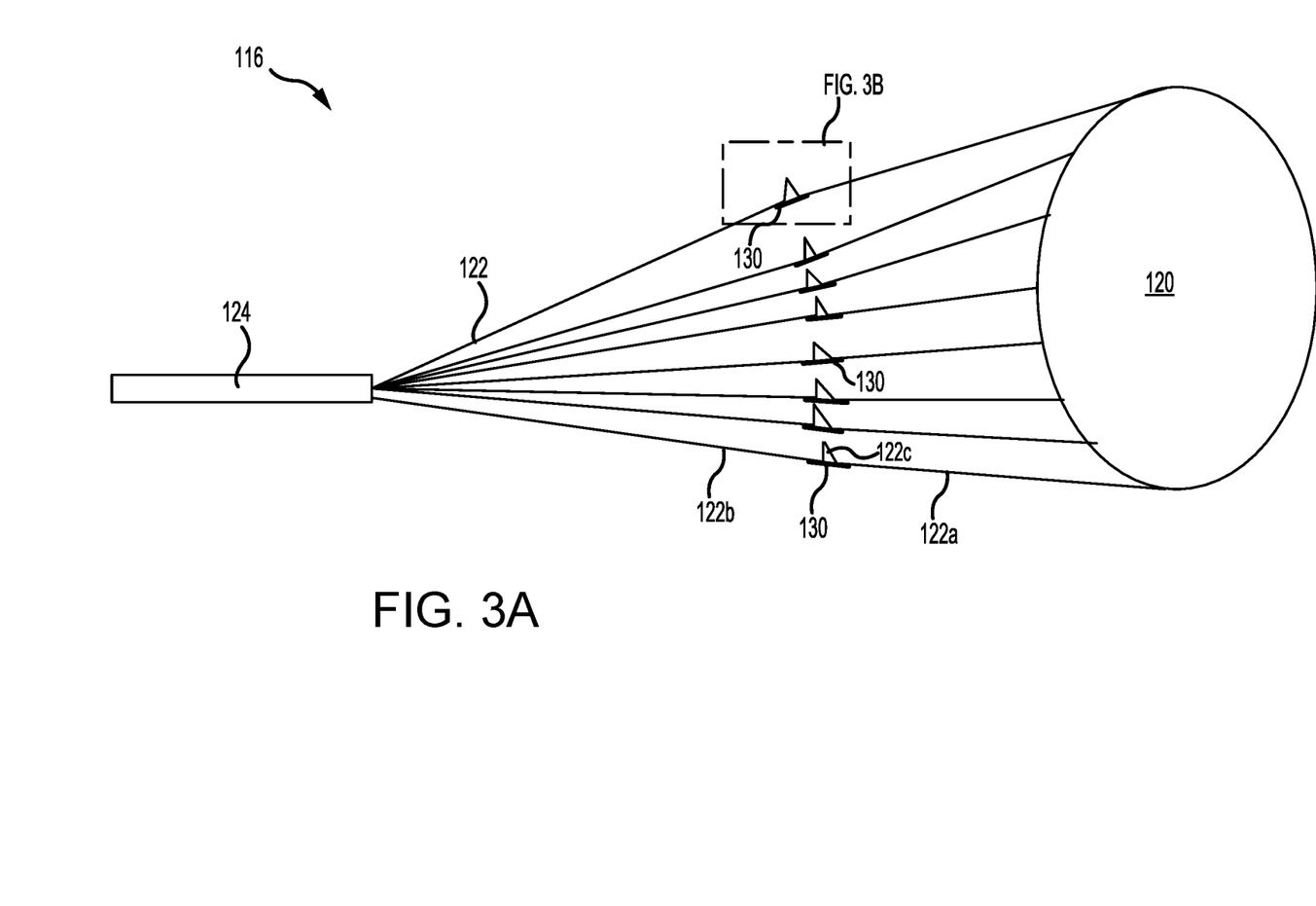
FIG. 3A illustrates a parachute assembly having elastomeric inserts, in accordance with various embodiments.
Figure 3B:
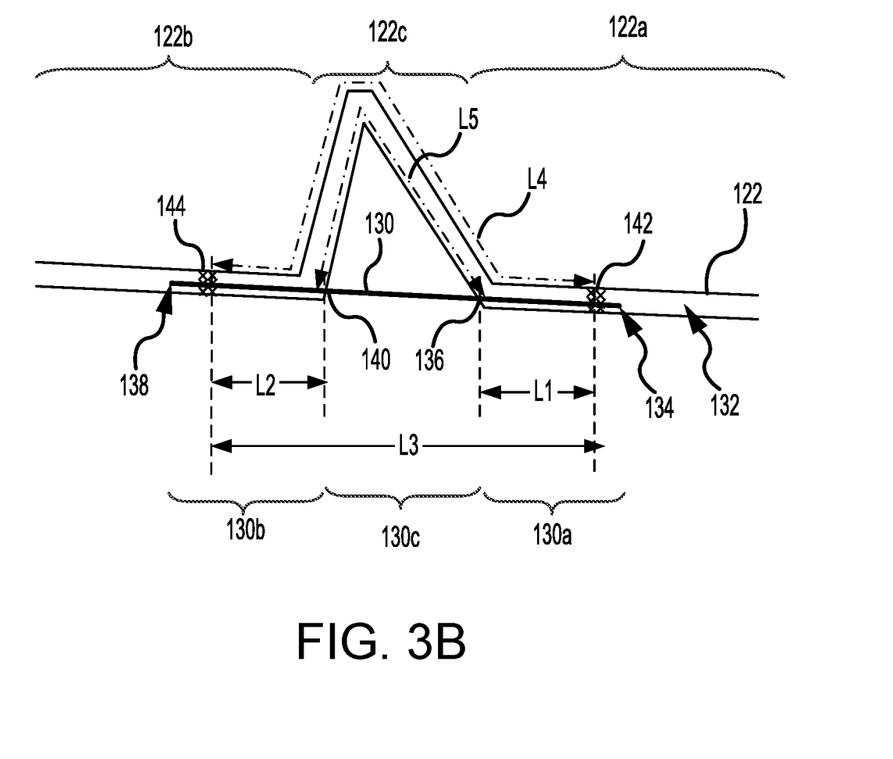
FIG. 3B illustrates a portion of the suspension line having an elastomeric insert coupled via stitching, in accordance with various embodiments.

With reference to FIGS. 3A and 3B, additional details of parachute assembly 116 are illustrated. In accordance with various embodiments, each suspension line 122 includes an elastomeric insert 130. Elastomeric insert 130 may comprise a relatively flexible and/or elastomeric material such as, for example, rubber, synthetic rubber, silicone, or a polyether-polyurea copolymer such as Lycra®, Spandex, and/or Elastane. In various embodiments, elastomeric insert 130 may comprise a tension spring. In various embodiments, suspension line 122 comprises a tubular, braided material and, at least, a portion of elastomeric insert 130 may be located in an internal volume 132 of suspension line 122. For example, a first segment 130a and a second segment 130b of elastomeric insert 130 may be located in internal volume 132 and a third segment 130c may be located outside (i.e., external to) internal volume 132. First segment 130a extends from a first end 134 of elastomeric insert 130 to an opening 136 in suspension line 122. Second segment 130b extends from a second end 138 of elastomeric insert 130 to an opening 140 in suspension line 122. Third segment 130c extends between opening 136 and opening 140 (i.e., between first segment 130a and second segment 130b). In this regard, suspension line 122 includes a first portion 122a extending from opening 136 to canopy 120, a second portion 122b extending between opening 140 an riser 124, and a third portion 122c extending between opening 136 and opening 140. Elastomeric insert 130 is located external to (i.e., outside) third portion 122c.

In various embodiments, first segment 130a may be coupled to suspensions line 122 via stitching 142 and second segment 130b may be coupled suspension line 122 via stitching 144. In various embodiments, a length L1 of elastomeric insert 130 is at least 6.0 inches (15.24 cm). Length L1 is measured between stitching 142 and opening 136. A length L2 of elastomeric insert 130, extending between stitching 144 and opening, is at least 6.0 inches (15.24 cm). In accordance with various embodiments, when elastomeric insert 130 is in a non-extended stated, a length L3 of elastomeric insert 130, as measured between stitching 142 and stitching 144 is less than a length L4 of suspension line 122, as measured between stitching 142 and stitching 144. In accordance with various embodiments, as tension in suspension line 122 increases first end 134, stitching 142 and opening 136 translate away from second end 138, stitching 144, and opening 140, thereby causing elastomeric insert 130 to stretch and the length L3 of elastomeric insert 130 to increase. The material and length of elastomeric insert 130 are selected such that elastomeric insert 130 can stretch to the length L4 of suspension line 122 without breaking (i.e., length L3 may equal length L4). Stated differently, the length L5 of the third portion 122c of suspension line 122 (i.e., the length of suspension line 122 extending from opening 136 to opening 140) is equal to or less than the difference between the length L3 of elastomeric insert 130 in the unstretched stated and the length L3 of elastomeric insert 130 in the fully stretched state.

Elastomeric insert 130 may reduce the force experienced by an occupant or object supported by parachute assembly 116 by attenuating the load imparted to the suspension line 122. Elastomeric insert 130 also reduces the peak load imparted on the suspension line before equilibrium of the suspension lines is reached. Stated differently, should the opening of canopy 120 cause force to be applied unequally to the suspension lines 122, elastomeric insert 130 tends to reduce the maximum load applied to its respective suspension line (i.e. the suspension line to which it is coupled) prior to the force equalized or balanced across all of the suspension lines.

Figure 4:
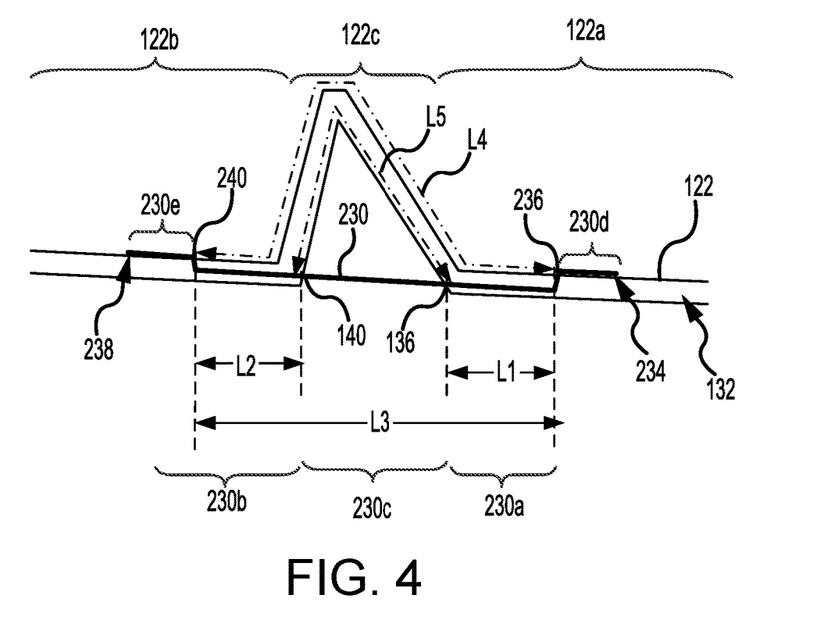
FIG. 4 illustrates a portion of the suspension line having an elastomeric insert; in accordance with various embodiments.

With reference to FIG. 4, a portion of suspension line 122 including an elastomeric insert 230 to is illustrated. In accordance with various embodiments, one or more of the suspension line(s) 122 may including elastomeric insert 230 in place of or in addition to elastomeric insert 130 from FIG. 3B. Elastomeric insert 230 may comprise a relatively flexible and/or elastomeric material such as, for example, rubber, synthetic rubber, silicone, or a polyether-polyurea copolymer such as Lycra®, Spandex, and/or Elastane. In various embodiments, elastomeric insert 230 may comprise a tension spring. In various embodiments, at least, a portion of elastomeric insert 230 may be located in internal volume 132 of suspension line 122. For example, a first segment 230a and a second segment 230b of elastomeric insert 230 may be located in internal volume 132. In various embodiments, a third segment 230c, a fourth segment 230d, and a fifth segment 230e may be located outside (i.e., external to) internal volume 132. First segment 230a extends from opening 136 to opening 236 in suspension line 122. Second segment 230b extends from opening 140 to opening 240 in suspension line 122. Third segment 230c extends between opening 136 and opening 140 (i.e., between first segment 230a and second segment 230b). Fourth segment 230d extends between a first end 234 of elastomeric insert 230 and opening 236. Fifth segment 230e extends between a second end 238 of elastomeric insert 230 and opening 240.

In various embodiments, elastomeric insert 230 may be coupled to suspension line 122 via fourth segment 230d and fifth segment 230e. For example, fourth segment 230d and fifth segment 230e may each be coupled to suspension line 122 via adhesive and/or via a heat bonding. In various embodiments, fourth segment 230d and fifth segment 230e may each be coupled to suspension line 122 via crimping and/or knots formed by fourth segment 230d and fifth segment 230e. In this regard, the crimping and/or knots formed by fourth segment 230d and fifth segment 230e are configured to prevent fourth segment 230d and fifth segment 230e from translating, respectively, through opening 236 and opening 240.

In various embodiments, a length L1 of elastomeric insert 230 is at least 6.0 inches (15.24 cm). Length L1 is measured between opening 136 and opening 236. A length L2 of elastomeric insert 230, extending between opening 140 and opening 240, is at least 6.0 inches (15.24 cm). In accordance with various embodiments, when elastomeric insert 230 is in a non-extended stated, a length L3 of elastomeric insert 230, as measured between opening 236 and opening 240 is less than the length L4 of suspension line 122, as measured between opening 236 and opening 240. In accordance with various embodiments, as tension in suspension line 122 increases first end 234, opening 136, and opening 236 translate away from second end 238, opening 140, and opening 240, thereby causing elastomeric insert 230 (e.g., first, second and third segments 230a, 230b, 230c) to stretch and the length L3 of elastomeric insert 230 to increase. The material and length of elastomeric insert 230 are selected such that elastomeric insert 230 can stretch to the length L4 of suspension line 122 without breaking (i.e., length L3 may equal length L4). Stated differently, the length L5 of the third portion 122c of suspension line 122 (i.e., the length of suspension line 122 between opening 136 and opening 140) is equal to or less than the difference of the length L3 of elastomeric insert 230 in the unstretched stated and the length L3 of elastomeric insert 230 elastomeric insert 230 in the fully stretched state.

Elastomeric insert 230 may reduce the force experienced by an occupant or object supported by parachute assembly 116 by attenuating the load imparted to the suspension line 122. Elastomeric insert 230 also reduces the peak load imparted on the suspension line before equilibrium of the suspension lines is reached. Stated differently, should the opening of canopy 120 cause force to be applied unequally to the suspension lines 122, elastomeric insert 230 tends to reduce the maximum load applied to its respective suspension line (i.e. the suspension line to which it is coupled) prior to the force equalized or balanced across all of the suspension lines.

Figure 5:
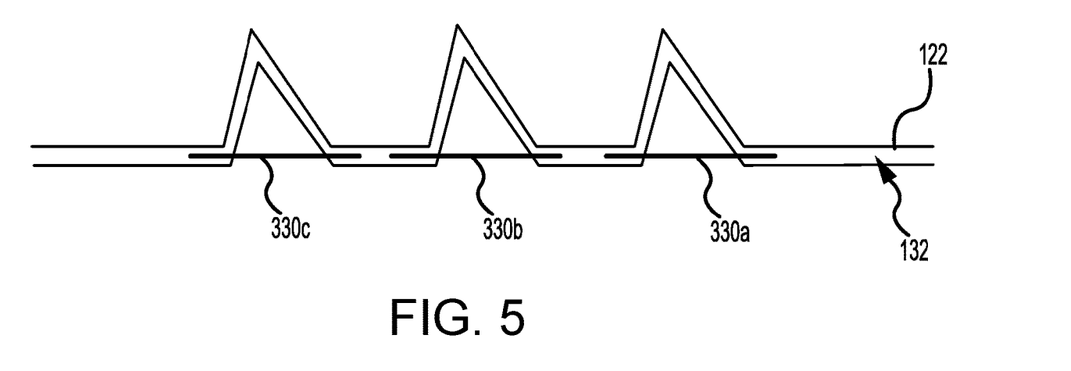
FIG. 5 a portion of the suspension line having multiple elastomeric inserts; in accordance with various embodiments.

With reference to FIG. 5, a portion of a suspension line 122 including a plurality of elastomeric inserts 330 is illustrated. In accordance with various embodiments, suspension line 122 may include any number of elastomeric inserts, such as for example, first elastomeric insert 330a, second elastomeric insert 330b, and third elastomeric insert 330c (collectively elastomeric inserts 330). Elastomeric inserts 330 may comprise a relatively flexible and/or elastomeric material such as, for example, rubber, synthetic rubber, silicone or a polyether-polyurea copolymer such as Lycra®, Spandex, and/or Elastane. In various embodiments, one or more elastomeric insert(s) 330 may comprise a tension spring. In various embodiments, one or more of elastomeric insert(s) 330 may be coupled to suspension line 122 via stitching, similar to elastomeric insert 130 in FIG. 3B. In various embodiments, one or more of elastomeric insert(s) 330 may be coupled to suspension line 122 via adhesive, heat bonding, crimping, and/or knotting, similar to elastomeric insert 230 in FIG. 4. While FIG. 5 illustrates three elastomeric inserts 330, it is further contemplated and understood that suspension line 122 may include any number of elastomeric inserts 330. Further, while FIG. 5 illustrates first elastomeric insert 330a, second elastomeric insert 330b, and third elastomeric insert 330c as three discrete pieces of elastomeric material, it is further contemplated and understood that in various embodiments, first elastomeric insert 330a, second elastomeric insert 330b, and third elastomeric insert 330c may be part of a single piece of elastomeric material that extends into and out of the internal volume 132 of suspension line 122 at multiple locations.

Elastomeric inserts 330 may reduce the force experienced by an occupant or object supported by parachute assembly 116 by attenuating the load imparted to the suspension line 122. Elastomeric inserts 330 also reduce the peak load imparted on the suspension line before equilibrium of the suspension lines is reached.

Figure 6A:
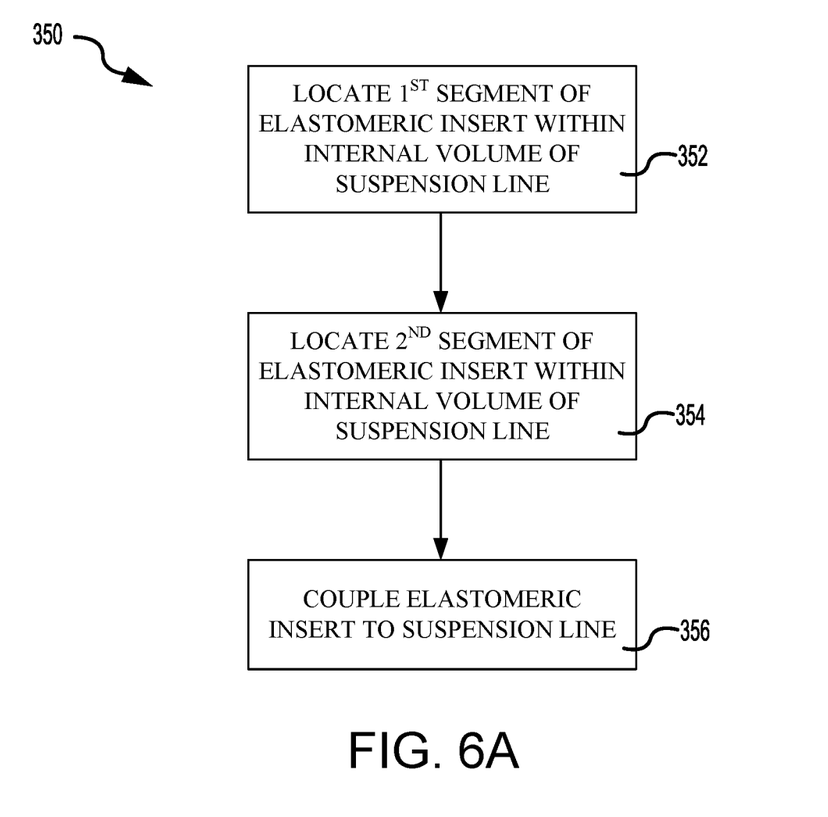
FIGS. 6A, 6B, and 6C illustrate a method of making a parachute assembly, in accordance with various embodiments.

With reference to FIG. 6A, a method 350 of making a parachute assembly is illustrated. In accordance with various embodiments, method 350 may comprise locating a first segment of an elastomeric insert within an internal volume of a suspension line of the parachute assembly (step 352) and locating a second segment of the elastomeric insert within the internal volume of the suspension line (step 354). In accordance with various embodiments, a third segment of the elastomeric insert is located external (i.e., outside) the internal volume of the suspension line. The third segment may extend between the first segment and the second segment. Method 350 may further include coupling the first segment of the elastomeric insert and the second segment of the elastomeric insert to the suspension line (step 356).

Figure 6B:
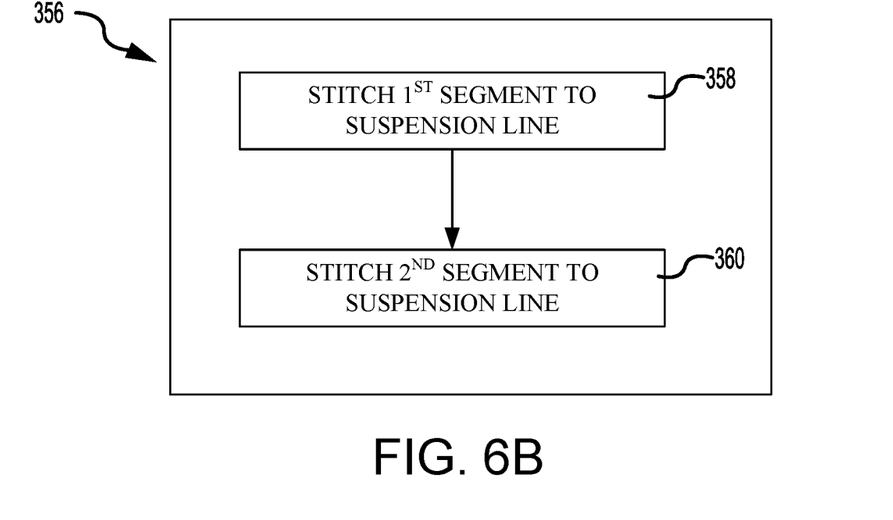

With reference to FIG. 6B, in various embodiments, step 356 may comprise stitching the first segment of the elastomeric insert to the suspension line (step 358) and stitching the second segment of the elastomeric insert to the suspension line (step 360).

Figure 6C:
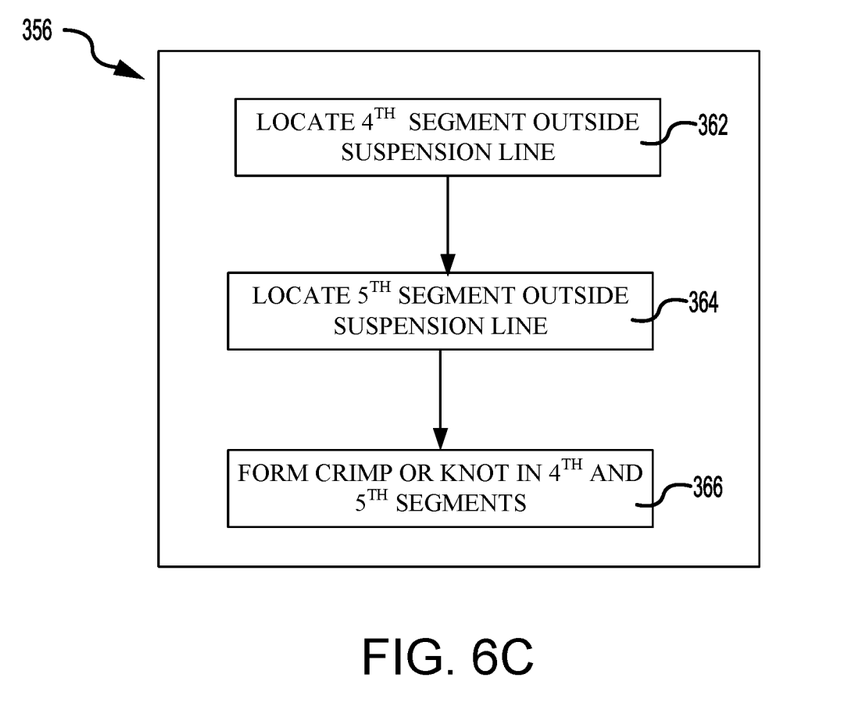

With reference to FIG. 6C, in various embodiments, step 356 may comprises: locating a fourth segment of the elastomeric insert outside the suspension line (step 362) and locating a fifth segment of the elastomeric insert outside the suspension line (step 364). The fourth segment may extend from the first segment of the elastomeric insert to a first end of the elastomeric insert. The fifth segment may extend from the second segment of the elastomeric insert to a second end of the elastomeric insert. The second end of the elastomeric insert is opposite the first end.

In various embodiments, step 356 may further comprise forming at least one of a crimp or a knot in each of the fourth segment and the fifth segment of the elastomeric insert (step 366). The crimp or the knot is configured to prevent the fourth and fifth segments from translating into the internal volume of the suspension line.

In various embodiments, step 356 may further comprise coupling the fourth segment and/or the fifth segment of the elastomeric insert to the suspension line using adhesive and/or heat bonding.

Figure 7:
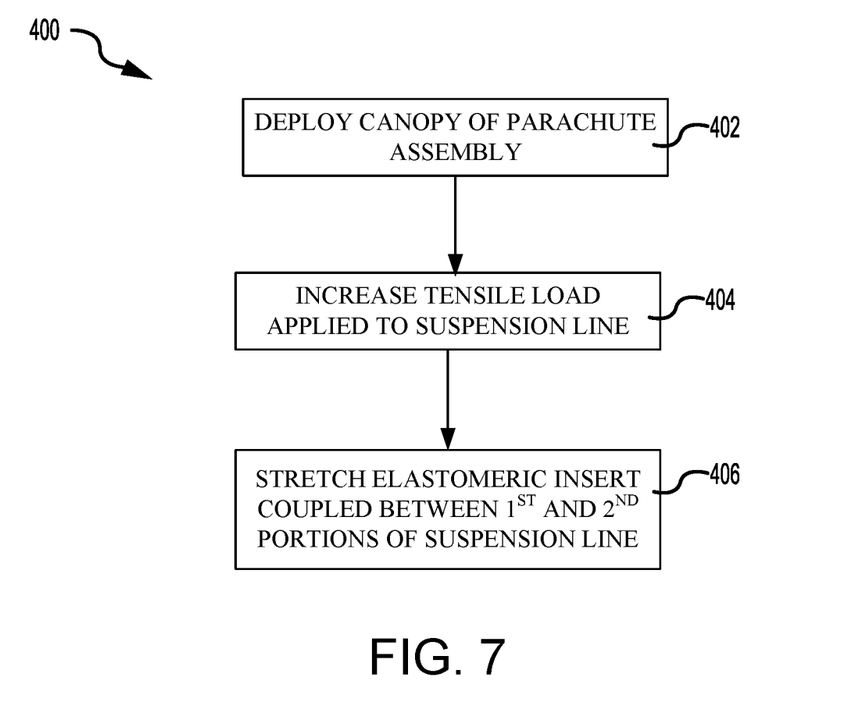
FIG. 7 illustrates a method of testing a parachute assembly, in accordance with various embodiments.

With reference to FIG. 7, a method 400 of testing a parachute assembly is illustrated. In accordance with various embodiments, method 400 may comprise deploying a canopy of the parachute assembly (step 402), increasing a tensile load applied to a suspension line coupled to the canopy (step 404), and stretching an elastomeric insert coupled between a first portion of the suspension line and a second portion of the suspension line (step 406).

With combined reference to FIGS. 2, 3B, 4, and 7, in various embodiments, step 402 may include deploying canopy 120 of parachute assembly 116. Step 404 may include increasing a tensile load applied to suspension line 122. The tensile load applied to suspension line 122 may increase in response to the deployment of canopy 120. Step 406 may include stretching elastomeric insert 130, 230 coupled between first portion 122a of suspension line 122 and second portion 122b of suspension line 122. Elastomeric insert 130, 230 may stretch in response to the increasing tensile load applied to suspension line 122.

In various embodiments, the elastomeric insert 130, 230 is coupled to the suspension line 122 at a first attachment point (e.g., stitching 142, opening 236) and at a second attachment point (e.g., stitching 142, opening 236). A length L3 of the elastomeric insert 130, 230, as measured between the first attachment point and the second attachment point, is configured to allow the elastomeric insert 130, 230 to stretch to a length L4 of the suspension line 122, as measured between the first attachment point and the second attachment point, without breaking.

In various embodiments, the elastomeric insert 130, 230 may include a first segment 130a, 230a located within an internal volume 132 of the suspension line 122, a second segment 130b, 230b located within the internal volume 132 of the suspension line 122, and a third segment 130c, 230c extending between the first segment 130a, 230a and the second segment 130b, 230b and located outside to the suspension line 122.

In various embodiments, the elastomeric insert may further include a fourth segment 230d located outside the suspension line 122 and extending from the first segment 230a to a first end 234 of the elastomeric insert, and a fifth segment 230a located outside the suspension line 122 and extending from the second segment 230b to a second end 238 of the elastomeric insert.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parachute assembly, comprising:
   a suspension line;
   a first elastomeric insert coupled between a first portion of the suspension line and a second portion of the suspension line, wherein at least a portion of the first elastomeric insert is located within an internal volume of the suspension line.

2. The parachute assembly of claim 1, further comprising:
   a first stitching coupling a first segment of the first elastomeric insert to the first portion of the suspension line; and
   a second stitching coupling a second segment of the first elastomeric insert to the second portion of the suspension line.

3. The parachute assembly of claim 2, wherein a third segment of the first elastomeric insert is located external to the suspension line, the third segment extending between the first segment and the second segment.

4. The parachute assembly of claim 3, wherein a length of the first segment of the first elastomeric insert is at least 6 inches, the length of the first segment being measured between the first stitching and an opening in the suspension line through which the first elastomeric insert is located.

5. The parachute assembly of claim 1, wherein the first elastomeric insert includes:
   a first segment located within the internal volume of the suspension line;
   a second segment located within the internal volume of the suspension line, the portion of the first elastomeric insert comprising at least one of the first segment and the second segment;
   a third segment located external to the suspension line and extending between the first segment and the second segment;
   a fourth segment located external to the suspension line and extending from the first segment to a first end of the first elastomeric insert; and
   a fifth segment located external to the suspension line and extending from the second segment to a second end of the first elastomeric insert.

6. The parachute assembly of claim 5, wherein the fourth segment is coupled to the suspension line by at least one of an adhesive or a heat bonding.

7. The parachute assembly claim 5, wherein the fourth segment includes at least one of a crimp or a knot configured to block the fourth segment from translating into the internal volume of the suspension line.

8. The parachute assembly claim 1, further comprising a second elastomeric insert coupled to the suspension line.

9. A parachute assembly, comprising:
   a canopy; and
   a plurality of suspension lines coupled to the canopy, wherein each suspension line of the plurality of suspension lines includes an elastomeric insert coupled between a first portion of the suspension line and a second portion of the suspension line, and wherein at least a portion of the elastomeric insert is located within an internal volume of the suspension line.

10. The parachute assembly of claim 9, wherein each suspension line of the plurality of suspension lines further includes:
    a first stitching coupling a first segment of the elastomeric insert to the first portion of the suspension line; and
    a second stitching coupling a second segment of the elastomeric insert to the second portion of the suspension line.

11. The parachute assembly of claim 10, wherein a third segment of the elastomeric insert is located external to the suspension line, the third segment extending between the first segment and the second segment.

12. The parachute assembly of claim 9, the elastomeric insert includes:
    a first segment located within the internal volume of the suspension line;

a second segment located within the internal volume of the suspension line, the portion of the elastomeric insert comprising at least one of the first segment and the second segment;

a third segment located external to the suspension line and extending between the first segment and the second segment;

a fourth segment located external to the suspension line and extending from the first segment to a first end of the elastomeric insert; and a fifth segment located external to the suspension line and extending from the second segment to a second end of the elastomeric insert.

13. The parachute assembly of claim 12, wherein the fourth segment is coupled to the suspension line by at least one of an adhesive or a heat bonding.

14. The parachute assembly of claim 12, wherein the fourth segment includes at least one of a crimp or a knot configured to block the fourth segment from translating into the internal volume of the suspension line.

15. A method of testing a parachute assembly, comprising:
deploying a canopy of the parachute assembly;
increasing a tensile load applied to a suspension line coupled to the canopy; and
stretching an elastomeric insert coupled between a first portion of the suspension line and a second portion of the suspension line, wherein at least a portion of the elastomeric insert is located within an internal volume of the suspension line.

16. The method of the claim 15, wherein the elastomeric insert is coupled to the suspension line at a first attachment point and at a second attachment point, and wherein a length of the elastomeric insert, as measured between the first attachment point and the second attachment point, is configured to allow the elastomeric insert to stretch to a length of the suspension line, as measured between the first attachment point and the second attachment point, without breaking.

17. The method of claim 16, wherein the elastomeric insert includes:
a first segment located within the internal volume of the suspension line;
a second segment located within the internal volume of the suspension line, the portion of the elastomeric insert comprising at least one of the first segment and the second segment; and
a third segment extending between the first segment and the second segment and located outside to the suspension line.

18. The method of claim 17, wherein the elastomeric insert further includes:
a fourth segment located outside the suspension line and extending from the first segment to a first end of the elastomeric insert; and
a fifth segment located outside the suspension line and extending from the second segment to a second end of the elastomeric insert.

* * * * *